UNITED STATES PATENT OFFICE.

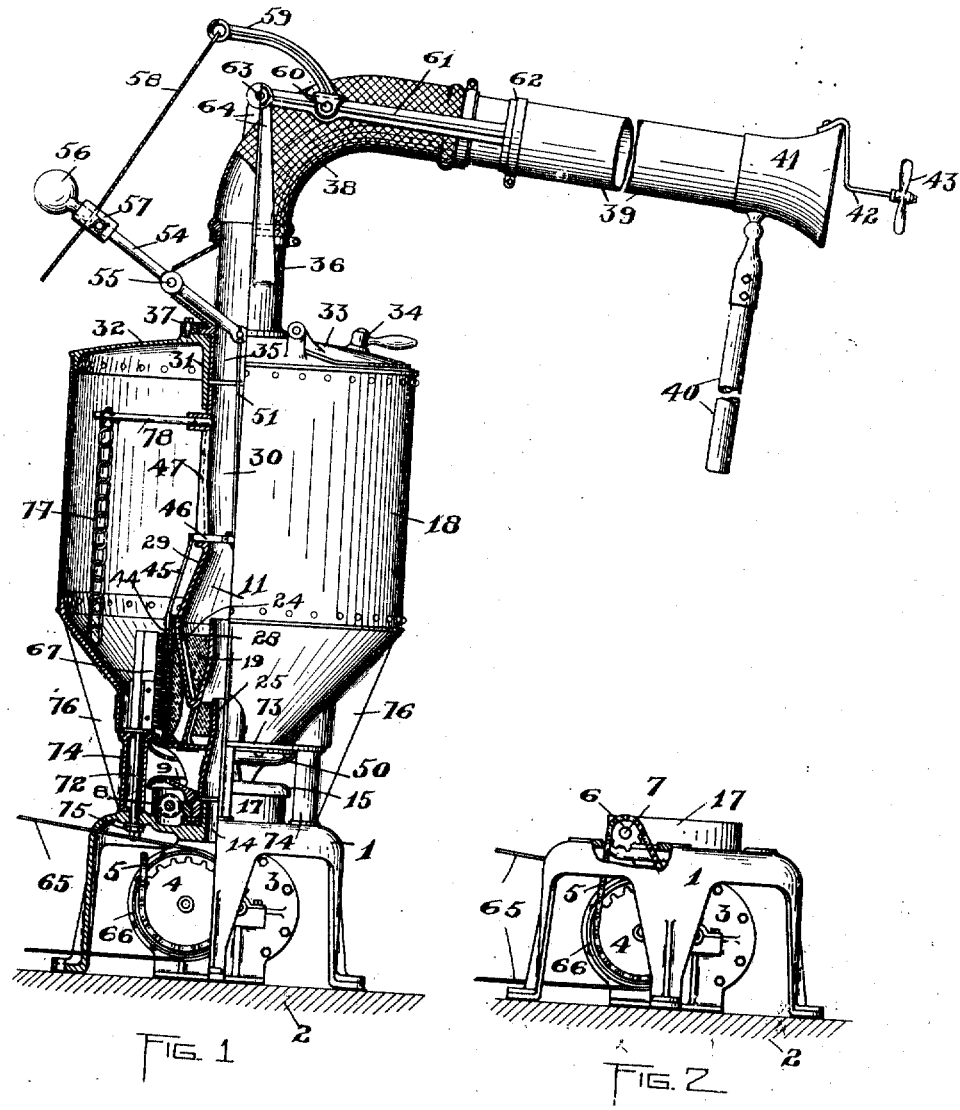

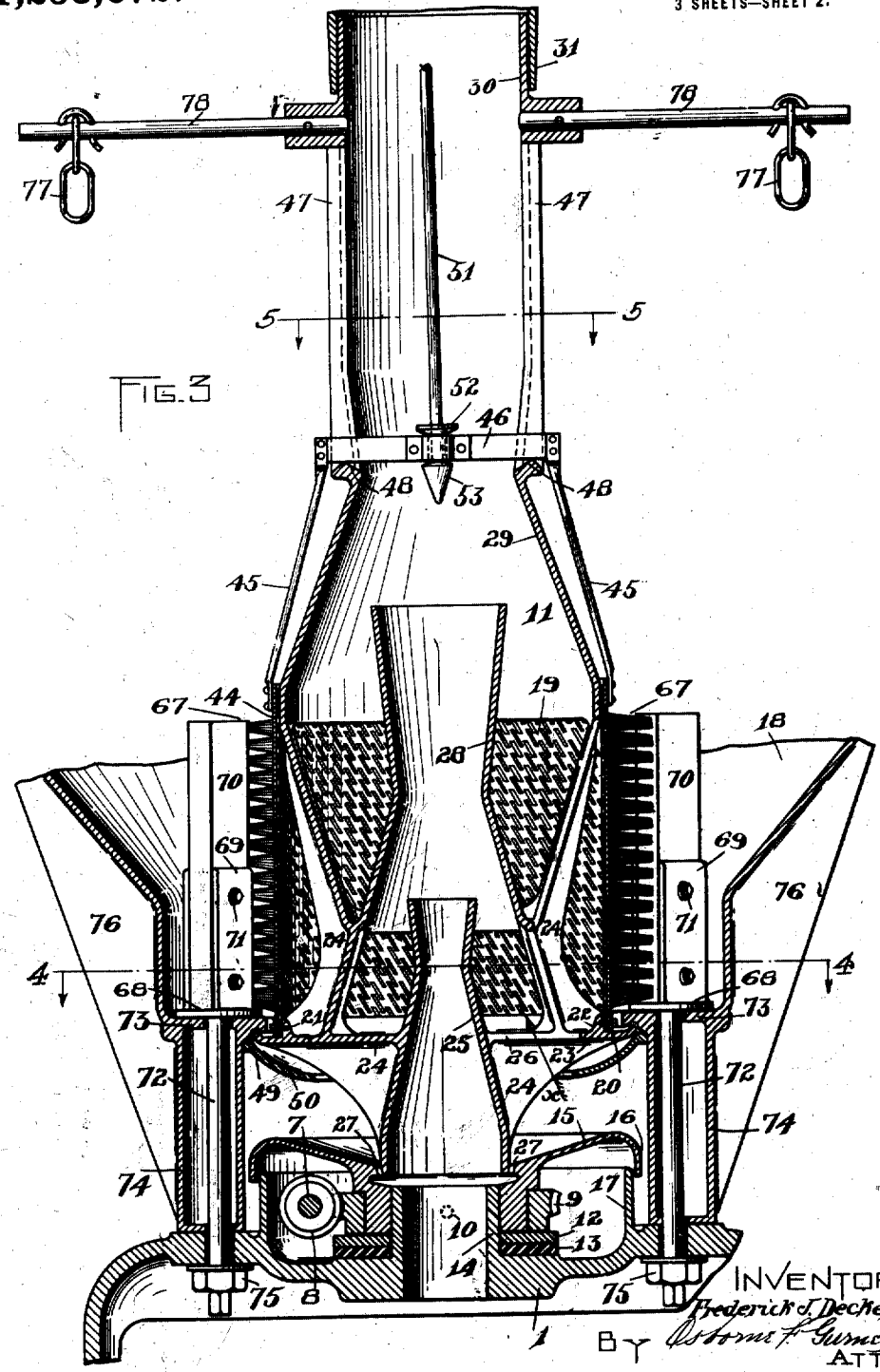

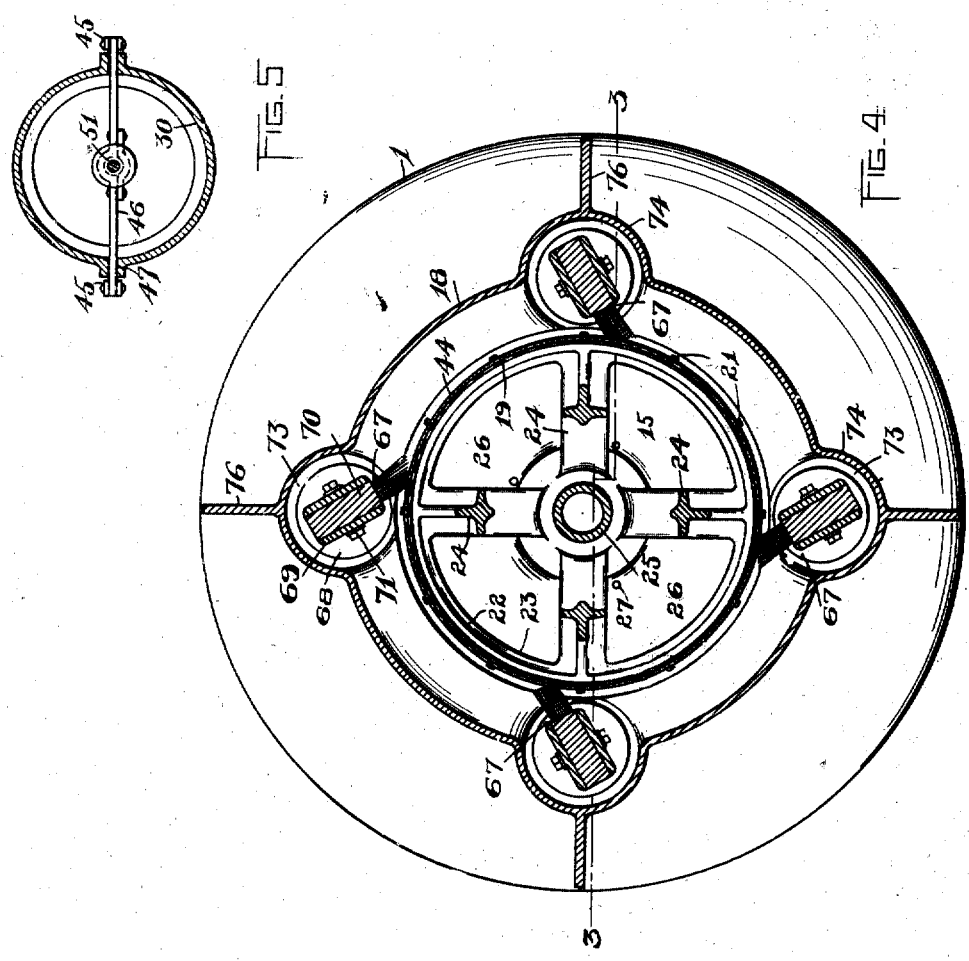

FREDERICK J. DECKER, OF ROCHESTER, NEW YORK, ASSIGNOR TO NIAGARA SPRAYER COMPANY, OF MIDDLEPORT, NEW YORK, A CORPORATION.

DUSTING AND SPRAYING APPARATUS.

1,253,672.  Specification of Letters Patent.  Patented Jan. 15, 1918.

Application filed May 29, 1916. Serial No. 100,569.

*To all whom it may concern:*

Be it known that I, FREDERICK J. DECKER, a citizen of the United States, residing at Rochester, in the county of Monroe and State of New York, have invented a new and Improved Dusting or Spraying Apparatus, of which the following is a specification.

This invention relates to apparatus for discharging fine sulfur, or other insect or fungus preventing or destroying substance, upon trees, vines, plants, or other vegetable growths.

The invention has for its main object to assure a uniform and adequate dusting or spraying of said substance throughout the entire vegetable growth, whereby all its leaf and fruit surfaces will be amply covered and thereby protected from the ravages of insects or fungi.

A further object is to provide for automatic adjustment of the discharge of sulfur or sprayed substance proportionately to its range of trajectory from the more or less elevated discharge tube to parts of the trees or vines more or less distant from the apparatus.

A final object is to provide a simple and efficient duster or sprayer which may have large capacity, and is not liable to choke or clog in use, and may be operated by any ordinary farm or vineyard workman.

The invention will first be described and then will be particularly defined in claims hereinafter set forth.

Reference is made to the accompanying drawings forming part of this specification, and in which:—

Figure 1 is a view showing, to the right, a side elevation and, to the left, a vertical central section of the improved duster or sprayer. Fig. 2 is a partly broken out side view of the duster base, detailing the chain drive for the perforated feeder of the apparatus. Fig. 3 is an enlarged vertical sectional view more especially showing interior parts of the apparatus and taken along the line 3—3 in Fig. 4. Fig. 4 is a sectional plan view taken along the line 4—4 in Fig 3. Fig. 5 is a detail sectional plan taken along the line 5—5 in Fig. 3.

The numeral 1, indicates a suitable metal base adapted for bolting to the bed 2, of a wagon body or other vehicle. Preferably within the base 1, is secured to the vehicle bed any suitable blast inducing blower or device 3, to a shaft of which is fixed a sprocket wheel 4, from which a driving chain 5, passes to a sprocket pinion 6, fixed to a shaft 7, carrying a worm 8, which meshes with a worm drive wheel 9, fixed by pins 10, or otherwise, to the lower end of the feeder 11, of the dusting or spraying substance. This feeder and the worm wheel 9, rest and rotate upon a metal washer 12, preferably overlying a fiber washer 13, both washers being placed around a hollow sleeve portion 14, of the base which projects upward within the feeder and provides a lower bearing for the feeder and its driving worm wheel 9, and also forms the air blast inlet to the feeder. A saucer-like portion 15, of the feeder has a pendent peripheral flange 16, which overlaps an upwardly projecting ring flange 17, of the base 1, in which the driving worm shaft 7, is journaled. The saucer 15, the flanges 16, 17, and the top plate portion of the base 1, thus together form a protecting guard for the feeder worm-drive gearing, and the saucer 15, also may catch any sulfur or other spraying substance falling from the reservoir 18 at or through or within the perforated feeder side wall 19. This side wall is fastened preferably by an external metal ring 20, and bolts 21, to a flange 22, rising from a lower annular peripheral feeder plate part 23, which is fixed to the lower parts of a series of preferably four vertically ranging rib or bracket feeder portions 24, the lower inner parts of which are rigidly connected to a primary air blast nozzle 25, which communicates with the air blast inlet collar 14, on the feeder base. There thus is provided between the feeder ribs 24, and outside of the nozzle 25, a series of free openings 26, shown more clearly in Figs. 3 and 4 of the drawings. A series of quite small vertical perforations 27, are formed through the feeder saucer 15, at or near its junction with the outside of the blast nozzle 25, and communicate with the blast inlet 14, as best shown in Fig. 3 of the drawings. A portion of the upward air blast through the inlet 14, thus may pass forcibly upward through the saucer perforations 27, and carry upward any fine sulfur or spraying substance which may have dropped into the saucer from the feeder. The sulfur thus ascending under influence of the upward air blast through the saucer perforations 27, is carried directly into the upward atmospheric air current induced outside of the blast nozzle 25, and through the feeder openings 26, in direction of the arrow $x$, in Fig. 3, by the exhausting action of said primary nozzle 25, discharging into the superimposed secondary nozzle 28, which discharges upward into a still larger upwardly tapering imperforate feeder portion 29, which is rigidly sustained by the upper ends of the feeder ribs 24, in position allowing the open end of the smaller blast nozzle 28, to project considerably and centrally within it. From said feeder wall portion 29, rises a preferably rigid metal discharge tube section 30, the upper end of which rotates snugly within a pendent collar or sleeve bearing portion 31, of the main fixed top wall 32, of the sulfur reservoir 18. This top 32, has a hinged lid part 33, fitted with a locking device 34, and may be opened to allow filling or charging of the reservoir with the sulfur or other substance to be dusted or sprayed. Within the top sleeve 31, also is loosely fitted the lower end bearing part 35, of a metal collar 36, forming part of the sulfur discharge tube and communicating at its lower end with the tube portion 30, of the feeder 11. One or more clips 37, overlying an external flange on the collar 36, hold it down to the reservoir top 32, and allow its manual turning thereon in a horizontal plane. To the outer end of this collar 36, is suitably clamped the lower rear end of a flexible discharge tube section 38, the forward end of which is clamped to the rear end of a preferably rigid final discharge tube section 39, which may have any desired length and also may have a hand manipulating pole 40, shown flexibly coupled to the flaring tube nozzle 41. To this nozzle 41, is fixed a rod 42, projecting in the nozzle axis and fitted with a fan or other device 43, which is rapidly rotated by impingement of the escaping sulfur or sprayed substance which thus is forcibly scattered laterally by the fan while being rapidly carried forward by the air blast or projecting means to the desired place of discharge.

An imperforate tubular or sleeve valve 44, is fitted closely but movably around the perforated feeder wall portion 19, and is shown coupled by two rods 45, with opposite ends of a thin cross-head 46, which passes freely through narrow vertical slots 47, in the feeder discharge tube 30. These slots permit sufficient vertical movement of the cross-head 46, for lifting the lower edge of the sleeve valve 44, nearly to the upper horizontal range of preferably diagonal slots or perforations in the feeder side wall 19, to thus allow maximum lateral inward passage of the sulfur or substance from the reservoir 18, through the wall perforations into the interior chamber of the feeder 11 whence the sulfur is forcibly carried upward under influence of the air blast and of the upwardly induced air current through the feeder openings 26, to and through the nozzle 28, through the collar 36, the flexible tube section 38, and the final discharge tube section 39; the parts 36, 38, 39, being manually movable horizontally upon the fixed reservoir top 32, to assure effective final lodgment of the dusted or sprayed sulfur or substance at any desired place of discharge. The slots 47, are quite narrow, hence such parts of them as may be covered by the original sulfur charge in the reservoir do not permit objectionable passage of the sulfur into the interior of the feeder 11, above the blast nozzle 28. The lower ends of the slots 47, and also the opposing parts of the cross-head 46, have knife edge formation at 48, preventing lodgment of sulfur at the base of the slots, thereby allowing the sleeve valve 44, to always descend fully upon the feeder side wall retaining ring 20, to fully prevent passage of sulfur from the reservoir 18, to the inside of the feeder 11, when the apparatus is not in use. Fig. 3 of the drawings more clearly shows that the periphery of the feeder plate 23, has outside of the perforated feeder wall 19, an upturned flange which rotates quite closely to and within an annular groove 49, in the reservoir frame. Any suitable packing, not shown, may be placed in this groove to prevent or minimize escape thereat of fine sulfur from the reservoir 18. An annular plate 50, fixed to the reservoir frame below the feeder ring plate portion 23, assists in directing the upwardly induced atmospheric air currents through the feeder openings 26.

Any suitable means may be used to raise the imperforate sleeve valve 44, more or less for permitting regulated sulfur passage through those perforations of the feeder side wall 19, then exposed to the sulfur in the reservoir 18, below the raised lower edge of this valve. One above named important object of this invention is to provide for operation of the valve 44, by the raising or lowering of the final discharge tube section 39, whereby as this tube part is raised to assure farther away lodgment of the sulfur or other sprayed substance upon the more distant parts of trees, vines or plants, the valve will be proportionately raised or farther opened automatically to assure more free discharge of sulfur from the reservoir 18, through the increased number of exposed perforations in the feeder side wall 19, and under exhaust influence of the upward air blast through the nozzles 25, 28. One means of connecting the valve 44, to the tube section 39, comprises a rod 51, fixedly carrying at its lower end two spaced heads 52, 53, between which the rod has a bearing in or on the cross-head 46, which thus is free to turn with the feeder 11, and the rods 45, carrying the valve 44, while the rod 51, does not rotate, but when raised or lowered said rod 51, will correspondingly raise or lower the rotating valve 44, on the rotating feeder 11. As shown, the upper end of the rod 51, is coupled to the inner end of a lever 54, which is fulcrumed at 55, to a lateral extension of the collar 36, and near its outer end, which carries a weight 56, the lever has a suitable split or other clamping device 57, including a thumb-screw adapted to tighten the clamp upon a flexible cable or cord 58, the upper end of which is coupled to an arm 59. This arm is bolted at 60, to one side arm of a stirrup or forked member 61, which is fixedly clamped at its collar 62, to the rigid discharge tube section 39, a little forward of its point of connection with the flexible tube section 38. The rear ends of the stirrup 61, are fulcrumed at 63, to opposite vertical arms 64, fixed to the revoluble collar 36, and consequently when the discharge nozzle of the tube 39, is raised the outer end of the arm 59, is lowered thereby allowing the weight 56, to raise the inner end of the lever 54, and the coupled rod 51, and correspondingly raise the cross-head 46, and the connected sleeve valve 44, to assure commensurate increased rate of air blast feed of sulfur from the reservoir 18, through the feeder 11, to the discharge tube or spout. The lever clamp 57, may be connected at different points along the cable 58, for more or less accurately timing the adjustment of the sleeve valve 44, relatively to vertical adjustments of the discharge tube nozzle 41. It is obvious that as the nozzle 41, is raised the valve 44, will be raised and farther opened, and as this nozzle is lowered the valve will be lowered and more nearly closed; and these valve adjustments are entirely automatic and reliable. The lever 54, may be coupled in any desired manner to the stirrup arm 59. The blower 3, is operated by a belt 65, running from the blower pulley 66, to any suitable gasolene or other motor mounted upon the vehicle bed or floor 2, which supports the dusting or spraying apparatus.

To more fully assure uniform air blast feed of the sulfur from the reservoir 18, to the discharge tube, one or more brushes 67 are fitted in the lower part of the reservoir for action upon any portion of the perforated feeder side wall 19, which may be exposed to the sulfur charge below the more or less raised lower edge of the imperforate sleeve valve 44. It is now preferred to use four brushes 67, equally spaced apart and as more clearly shown in Figs. 3 and 4 of the drawings. Each brush is adjustably held by fastenings which also provide a means for securing the reservoir and its overhanging discharge spout firmly to the duster or sprayer base 1. These fastenings preferably comprise a head plate 68, from which rise two spaced cheek-plates 69, to and between which the wood brush block 70 is fastened by bolts 71. A vertical spindle 72, fixed to the head plate 68, passes down through holes in the heads 73, of the tubular legs 74, and also through holes in the base 1, and below the base the spindle 72, has a nut 75, which when tightened securely fastens the brush in the proper working position relatively to the perforated feeder wall 19, and also secures the entire sulfur reservoir and its discharge tube to the fixed base 1, and without permitting leakage of sulfur from the reservoir at the brush fastenings. Strong brackets 76, connect the lower cast metal tapering bottom portion of the reservoir 18, with its preferably tubular legs 74. Loosening any brush securing nut 75, permits axial turning of the brush support 68, 69, 72, to allow readjustment of the wearing brush bristles relatively to the feeder wall 19, for assuring effective clearing or non-clogging of its preferably diagonal perforations and thus always secure an even or uniform feed and discharge of the fine sulfur for any given extent of opening of the feed control valve 44.

Agitators of any form may be provided in the reservoir 18, to assist downflow of the fine sulfur to and through the perforated feeder wall 19. It is preferred to provide a special flexible drag agitator such as a chain 77, hung from the outer end of an arm 78, projecting radially from a bearing or support on and near the upper end of the feeder outlet tube 30. This chain agitator 77, turns with the feeder 11, and drags through and over the gradually decreasing sulfur charge in the reservoir 18, thereby facilitating feed of the fine sulfur uniformly around the air blast nozzles 25, 28, which carry it through the discharge tube. One or more of these flexible agitators 77, may be used, two being shown in Fig. 3 of the drawings.

While this invention is herein more particularly described relatively to the discharge of fine sulfur or other powdered substance, certain features of the invention specified in the appended claims may be used in apparatus of other form or arrangement and more especially adapted for spraying a liquid or a liquid compound, as will readily be understood by those familiar with apparatus of this general character.

What I claim is:

1. A duster or sprayer comprising a reservoir for the substance to be sprayed, a discharge tube communicating with the reservoir, blast inducing devices drawing said substance from the reservoir and ejecting it from the discharge tube, means controlling feed of the substance from the reservoir to the discharge tube, and means automatically regulating the rate of feed of said substance from the reservoir to the discharge tube proportionately to the range of movement of the discharge tube nozzle.

2. A duster or sprayer comprising a reservoir for the substance to be sprayed, a discharge tube communicating with the reservoir, blast inducing devices drawing said substance from the reservoir and ejecting it from the discharge tube, a valve controlling feed of the substance from the reservoir to the discharge tube, and connections between the tube and the valve automatically actuating the valve and thereby regulating the rate of feed of said substance proportionately to the range of movement of the discharge tube nozzle.

3. A duster or sprayer comprising a fixed base, a reservoir on the base for the substance to be sprayed, a feeder revoluble in the reservoir and having a perforated wall portion, a discharge tube held to the reservoir and communicating with the feeder outlet, blast devices discharging into the tube and drawing said substance from the reservoir into the feeder through its wall perforations and then ejecting the substance from the discharge tube, and adjustably supported brushing means in the reservoir acting upon the perforated portion of the feeder wall to prevent clogging of it.

4. A duster or sprayer comprising a fixed base, a reservoir on the base for the substance to be sprayed, a feeder revoluble in the reservoir and having a perforated wall portion, a discharge tube held to the reservoir and communicating with the feeder outlet, blast devices discharging into the tube and drawing said substance from the reservoir into the feeder through its wall perforations and then ejecting the substance from the discharge tube, and brushing means in the reservoir acting upon the perforated portion of the feeder wall to prevent clogging of it; said brushing means having fastenings including parts adjustably holding the brush within the reservoir in proper relation to the perforated feeder wall and also securing the reservoir and its connected discharge tube to the duster base.

5. A duster or sprayer comprising a fixed base, a reservoir on the base for the substance to be sprayed, a feeder located in the reservoir and revolubly supported on the base, such feeder having a perforated cylindrical wall portion, a discharge tube communicating with the feeder outlet, blast devices discharging into the tube and drawing said substance from the reservoir into the feeder through its wall perforations and then ejecting the substance from the discharge tube, and a valve adjustably fitted over the perforated feeder wall and controlling the rate of spraying substance feed therethrough under the influence of the blast.

6. A duster or sprayer comprising a fixed base, a reservoir on the base for the substance to be sprayed, a feeder located in the reservoir and revolubly supported on the base, such feeder having a perforated cylindrical wall portion, a discharge tube communicating with the feeder outlet, blast devices discharging into the tube and drawing said substance from the reservoir into the feeder through its wall perforations and ejecting the substance from the discharge tube, a valve adjustably fitted over the perforated feeder wall and controlling the rate of spraying substance feed therethrough under the influence of the blast, and brushing means in the reservoir acting upon the outer surface of the perforated wall not covered by the valve.

7. A duster or sprayer comprising a reservoir for the substance to be sprayed, a feeder revoluble in the reservoir and having a perforated wall portion, a discharge tube communicating with the feeder outlet, blast devices discharging into the tube and drawing said substance from the reservoir into the feeder through its wall perforations and then ejecting the substance from the discharge tube, a valve adjustably fitted at the perforated feeder wall and controlling the rate of spraying substance feed therethrough under the influence of the blast, and connections between said valve and said discharge tube automatically actuating the valve and thereby regulating the spraying substance feed from the reservoir proportionately to the range of movement of the discharge tube nozzle.

8. A duster or sprayer comprising a reservoir for the substance to be sprayed, a feeder revoluble in the reservoir and having a perforated wall portion, blast devices discharging into the feeder, a valve adjustably fitted at the perforated feeder wall and controlling the rate of spraying substance feed therethrough under the influence of the blast, a discharge tube having an inner collar section manually revoluble on the reservoir top and communicating with the feeder outlet, a flexible intermediate section coupled to said inner collar section, and an outer section coupled to the forward end of said flexible section, a stirrup or part rigidly held to said outer tube section, and connections from said stirrup to the feeder valve whereby the valve is automatically actuated to regulate the feed of spraying substance from the reservoir proportionately to the range of movement of the nozzle of the outer discharge tube section.

9. A duster or sprayer comprising a reservoir for the substance to be sprayed, a feeder revoluble in the reservoir and having a perforated wall portion, blast devices discharging into the feeder, a valve adjustably fitted at the perforated feeder wall and controlling the rate of spraying substance feed therethrough under influence of the blast, a discharge tube having an inner collar section manually revoluble on the reservoir top and communicating with the feeder outlet, a flexible intermediate section coupled to said inner collar section, and an outer section coupled to the forward end of said flexible section, a stirrup or part rigidly held to said outer tube section and fulcrumed at its rear end to the inner collar tube section, a cross-head movable in bearings at the discharge portion of the feeder, connections from said cross-head to the feeder valve, a rod having a loose but endwise immovable bearing in said cross-head, a lever fulcrumed to the inner collar section of the discharge tube and coupled at its inner end to said rod, and connections from the outer end of the lever to the stirrup fixed to the outer discharge tube section.

10. A duster or sprayer comprising a reservoir for the substance to be sprayed, a feeder revoluble in the reservoir and having a perforated wall portion, blast devices discharging into the feeder, a valve adjustably fitted at the perforated feeder wall and controlling the rate of spraying substance feed therethrough under influence of the blast, a discharge tube having an inner collar section manually revoluble on the reservoir top and communicating with the feeder outlet, a flexible intermediate section coupled to said inner collar section, and an outer section coupled to the forward end of said flexible section, a stirrup or part rigidly held to said outer tube section and fulcrumed at its rear end to the inner collar tube section, a cross-head movable in bearings at the discharge portion of the feeder, connections from said cross-head to the feeder valve, a rod having a loose but endwise immovable bearing in said cross-head, a weighted lever fulcrumed to the inner collar section of the discharge tube and coupled at its inner end to said rod, an arm fixed to the stirrup of the outer discharge tube section, and a flexible cable coupled to said arm and to the outer end of the weighted lever.

11. In a dusting or spraying apparatus, the combination with a discharge tube, of a revoluble fan propeller at the tube nozzle laterally spreading a spraying substance forwardly ejected from the tube.

12. A duster or sprayer comprising a reservoir for the substance to be sprayed, a revoluble feeder opening to the reservoir, a discharge tube communicating with the feeder outlet, blast devices discharging into the feeder and tube and drawing said substance from the reservoir and ejecting it from the tube, and flexible agitator devices revoluble by the feeder and acting upon and through the charge of spraying substance in the reservoir.

13. A duster or sprayer comprising a reservoir for the sulfur or substance to be sprayed, a discharge tube communicating with the reservoir, blast inducing devices, a feeder revoluble in the reservoir and including two coacting spaced blast directing nozzles opening toward the feeder outlet, and skeleton ribs operatively sustaining the nozzles relatively to each other and to the feeder sulfur inlet and outlet, said ribs providing between them openings for free passage of atmospheric air around the outside of one nozzle and within the other nozzle, whereby the sulfur or substance is drawn from the reservoir into the feeder and is thence ejected through the discharge tube under influence of the blast through both nozzles aided by induced and commingling air currents.

14. A duster or sprayer comprising a reservoir for the sulfur or substance to be sprayed, a discharge tube communicating with the reservoir, blast inducing devices, a feeder revoluble in the reservoir and including two coacting spaced blast directing nozzles opening toward the feeder outlet, and skeleton ribs operatively sustaining the nozzles relatively to each other and to the feeder sulfur inlet and outlet, said ribs providing between them openings for free passage of atmospheric air around the outside of one nozzle and within the other nozzle; said feeder also carrying below its atmospheric air inlet openings a sulfur receptacle having perforations communicating with the feeder blast inlet, whereby sulfur falling from the feeder into or toward said receptacle will be carried by the blast passing through said perforations into the atmospheric air currents induced by the blast nozzles and will be thus automatically returned to the feeder.

15. A dusting or spraying apparatus comprising a reservoir for the substance to be sprayed, a revoluble feeder opening to the reservoir, a discharge tube communicating with the feeder outlet, blast devices discharging into the feeder and tube, and a base sustaining the reservoir and having two upwardly projecting flanges, the inner tubular flange forming the blast inlet to the feeder and discharge tube and providing a lower bearing for the feeder and its main driving wheel, and the outer flange providing bearings for other parts of the feeder driving mechanism; said feeder having an annular plate portion which coacts with the outer base flange to cover and guard the main feeder driving wheel and its engaged pinion or worm.

16. In a dusting or spraying apparatus, the combination with a sulfur reservoir and its discharge tube, of a revoluble feeder having a sulfur inlet from the reservoir and comprising supporting ribs providing atmospheric air inlet openings between them, upper and lower spaced blast nozzles sustained by said ribs, the lower nozzle receiving the blast and directing it through the upper nozzle, and an imperforate upper portion into which the said nozzles discharge the forced blast and the commingled atmospheric air currents on their way to the discharge tube.

17. In a dusting or spraying apparatus, the combination with a sulfur reservoir and its discharge tube, of a revoluble feeder having a sulfur inlet from the reservoir and comprising supporting ribs providing atmospheric air inlet openings between them, upper and lower spaced blast nozzles sustained by said ribs, the lower nozzle receiving the blast and directing it through the upper nozzle, and an imperforate upper portion into which the said nozzles discharge the forced blast and the commingled atmospheric air currents on their way to the discharge tube, said feeder also having a lower receptacle provided with perforations outside the said lower nozzle and communicating with the forced blast inlet.

18. In a dusting or spraying apparatus, the combination with a sulfur reservoir and its discharge tube, of a revoluble feeder having a sulfur inlet from the reservoir and comprising supporting ribs providing atmospheric air inlet openings between them, upper and lower spaced blast nozzles sustained by said ribs, the lower nozzle receiving the blast and directing it through the upper nozzle, an imperforate upper portion into which the said nozzles discharge the forced blast and the commingled atmospheric air currents on their way to the discharge tube, and a lower receptacle provided with perforations outside of the said lower nozzle and communicating with the forced blast inlet; the said reservoir carrying a fixed annular plate directing the induced atmospheric air currents toward the openings between said supporting ribs, substantially as described.

FREDERICK J. DECKER.